United States Patent
Watanabe

(10) Patent No.: US 6,393,928 B1
(45) Date of Patent: May 28, 2002

(54) CONTROL DEVICE FOR SYNCHRONOUS MESH AUTOMATIC TRANSMISSION

(75) Inventor: Shinji Watanabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/572,912

(22) Filed: May 17, 2000

(30) Foreign Application Priority Data

Nov. 17, 1999 (JP) ............................................. 11-326759

(51) Int. Cl.[7] .......................... F16H 59/04; F16H 59/36
(52) U.S. Cl. ...................................... 74/336 R; 74/339
(58) Field of Search ............................... 74/336 R, 335, 74/339

(56) References Cited

U.S. PATENT DOCUMENTS

| | | | | |
|---|---|---|---|---|
| 4,519,484 A | * | 5/1985 | Nagaoka et al. | 74/336 R X |
| 4,676,115 A | * | 6/1987 | Morscheck et al. | 74/339 |
| 4,873,881 A | * | 10/1989 | Edelen et al. | 74/336 R |
| 5,219,391 A | * | 6/1993 | Edelen et al. | 74/335 |
| 5,490,063 A | * | 2/1996 | Genise | 74/335 X |
| 5,508,916 A | * | 4/1996 | Markyvech et al. | 74/339 X |
| 5,533,946 A | * | 7/1996 | Markyvech | 74/335 X |
| 5,660,079 A | * | 8/1997 | Friedrich | 74/335 X |
| 6,044,721 A | * | 4/2000 | Genise | 74/335 |
| 6,145,398 A | * | 11/2000 | Bansbach et al. | 74/335 |
| 6,146,149 A | * | 12/2000 | Ohmori et al. | 74/335 X |

FOREIGN PATENT DOCUMENTS

| | | | | |
|---|---|---|---|---|
| EP | 512708 | * | 11/1992 | 74/336 R |
| JP | 63-270252 | | 11/1988 | B60K/41/02 |

* cited by examiner

Primary Examiner—Charles A Marmor
Assistant Examiner—Ha Ho
(74) Attorney, Agent, or Firm—Sughrue Mion, PLLC

(57) ABSTRACT

At the time of a gear stage change in a synchronous mesh automatic transmission, the transmission performs an automatic speed change with a speed change position control that utilizes a shift select actuator. The transmission is provided with a speed sensor for detecting rotational speeds of input and output shafts so as to detect the operating state of the synchronizer at the time of the gear stage change. A rotational synchronization starting shift position controlled by the shift actuator is detected and learned by a shift position sensor. The synchronization starting shift position is learned by the shift position sensor using a relationship of rotational speeds of the input and output shafts of the transmission under the shift control, and the shift position control is carried out, effecting improved durability of the synchronizer, and speedy shift control without gear noise.

9 Claims, 7 Drawing Sheets

CONTROL DEVICE FOR SYNCHRONOUS MESH AUTOMATIC TRANSMISSION

BACKGROUND OF THE INVENTION

1. Field of the Invention

The present invention relates to a control device for a synchronous mesh automatic transmission, and in particular, to a technology for suppressing gear noise caused when a gear stage is changed in a synchronous mesh staged transmission, and enhancing durability of a synchronizing mechanism.

2. Description of the Related Art

Japanese Patent Application Laid-Open No. Sho. 63-270252 discloses a conventional control device for a synchronous mesh automatic transmission, in which with ON/OFF operation of an electromagnetic clutch, the driving force of an engine is inputted through the electromagnetic clutch to the synchronous mesh automatic transmission, a selection of transmission gears is carried out by driving a three position selection hydraulic cylinder through operative combination of a pair of hydraulic electromagnetic valves, and a change of transmission gear stages is carried out by driving a three position shifting hydraulic cylinder through operative combination of a pair of hydraulic electromagnetic valves.

However, since a magnetic powder type electromagnetic clutch is used as a clutch for transmission/interruption of power between the engine and the transmission, an increased inertial force on the input shaft side of the transmission is unavoidable. Further, since the change of the transmission gear stages is carried out by shift driving of the three position shifting hydraulic cylinder, the synchronizing motion at the time of the gear stage change is abrupt, thereby hindering smooth rotational synchronization between the input shaft side of the transmission and the output shaft side thereof at the time of the gear stage change. Consequently, the device suffers from gear noise at the time of the change of the gear stage change, and durability of the synchronizing mechanism. If the synchronizing mechanism is increased in strength for the purpose of securing the durability, there arises another problem such as increased size, increased cost, or the like. On the other hand, if the shift motion is made slow for the purpose of suppressing the gear noise, the time period required for the gear change becomes unnecessarily long, which is undesirable in terms of the shift feeling.

SUMMARY OF THE INVENTION

According to one aspect of the present invention, there is provided a control device for a synchronous mesh automatic transmission that automatically changes a plurality of gear stages, the control device comprising: an input shaft; an output shaft; a plurality of speed-changing gear trains for transmitting a rotation of the input shaft to the output shaft while changing a speed of rotation; a shift gear for selecting one of the plurality of speed-changing gear trains, and transmitting power from the input shaft to the output shaft through the thus selected speed-changing gear train; a shift actuator for driving the shift gear; a shift position sensor for detecting a shift position of the shift gear; an input shaft rotational speed sensor for detecting a rotational speed of the input shaft; an output shaft rotational speed sensor for detecting a rotational speed of the output shaft; and a control unit for learning and correcting, during a gear changing operation of the shift gear caused by the shift actuator, a synchronization starting shift position of the shift gear based on an output of the shift position sensor, and a relationship among a gear ratio, the rotational speed of the transmission input shaft detected by the input shaft rotational speed sensor, and the rotational speed of the transmission output shaft detected by the output shaft rotational speed sensor.

According to another aspect of the invention, there is provided a control device for a synchronous mesh automatic transmission that automatically changes a plurality of gear stages, the control device comprising: an input shaft; an output shaft; a plurality of speed-changing gear trains for transmitting a rotation of the input shaft to the output shaft while changing a speed of rotation; a shift gear for selecting one of the plurality of speed-changing gear trains, and transmitting power from the input shaft to the output shaft through the thus selected speed-changing gear train; a shift actuator for driving the shift gear in an axial direction; a shift position sensor for detecting a shift position of the shift gear; a select actuator for driving the shift gear in a rotational direction to thereby select one of the plurality of speed-changing gear trains; a select position sensor for detecting a select position of the select actuator; an input shaft rotational speed sensor for detecting a rotational speed of the input shaft; an output shaft rotational speed sensor for detecting a rotational speed of the output shaft; and a control unit for determining, during a gear changing operation of the shift gear caused by the shift actuator, the completion of the gear changing operation based on a relationship among the input shaft rotational speed and the output shaft rotational speed of the transmission, and a gear ratio, and based on a relationship between the shift gear shift position detected by the shift position sensor and the shift gear select position detected by the select position sensor.

Preferably, an initial value of the synchronization starting shift position learned value is set based on a shift neutral position learned value and a shift completion position learned value of the shift gear learned by the control unit.

Preferably, a switch is provided for turning on and off power supplied from a battery to the control unit, wherein the shift neutral position and the shift completion position are learned when the switch is turned on after removal of the battery.

Preferably, the shift gear is moved at a first shift speed from a shift starting position to a synchronization starting shift position of the shift gear, and at a second shift speed from the synchronization starting shift position to a shift completion position of the shift gear determined by the control unit during the gear changing operation of the shift gear.

Preferably, the second shift speed from the synchronization starting shift position to the shift completion position of the shift gear is set based on the kind of a speed change, and the transmission output shaft rotational speed during the gear changing operation of the shift gear.

The above and other objects, features and advantages of the present invention will more readily apparent from the following detailed description of presently preferred embodiments of the invention taken in conjunction with the accompanying drawings.

DETAILED DESCRIPTION OF THE PREFERRED EMBODIMENTS

Preferred embodiments of the present invention will now be described with reference to the accompanying drawings.

First Embodiment

Figure 1:
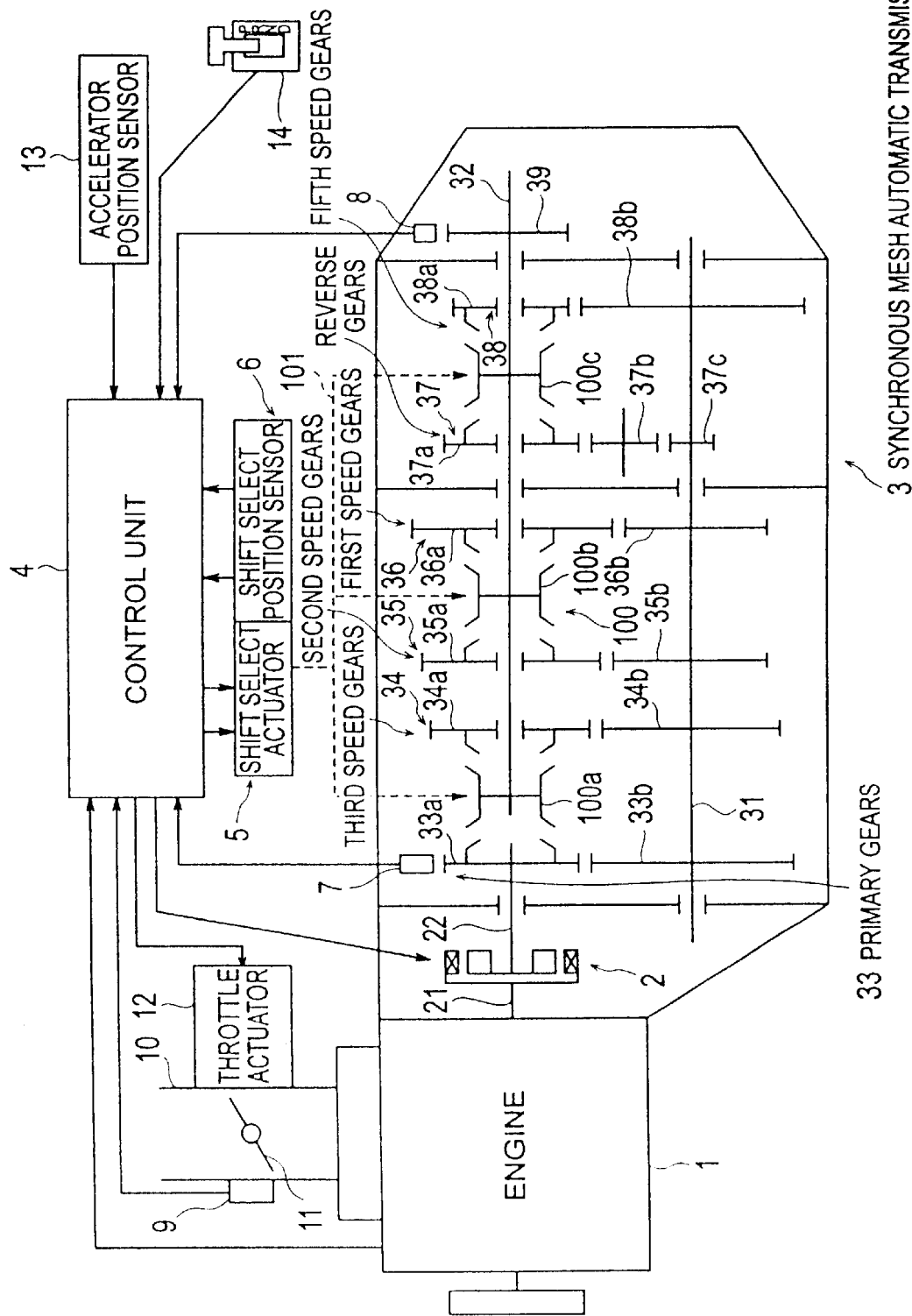
FIG. 1 shows the construction of a control device for a synchronous mesh automatic transmission according to the present invention.

FIG. 1 shows the construction of a control device for an synchronous mesh automatic transmission according to a first embodiment of the present invention.

In FIG. 1, there are schematically illustrated an internal combustion engine 1, an electromagnetic clutch 2, a synchronous mesh automatic transmission 3, and a control unit 4.

The engine 1 includes an intake pipe 10 with a throttle valve 11 disposed therein. The throttle opening position of the throttle valve 11 is detected by a throttle position sensor 9 which is provided on the inlet pipe 10 in the vicinity of the throttle valve 11. An output signal from the throttle position sensor 9 is inputted to the control unit 4.

The quantity by which a driver depresses an accelerator pedal (not shown) is detected by an accelerator position sensor 13, which outputs an signal in proportion to or representative of the depressed quantity of the accelerator pedal to the control unit 4. The control unit 4 processes the output signal from the accelerator position sensor 13, calculates a target throttle opening position depending on the depressed quantity of the accelerator pedal, and feed-back controls the throttle valve 11 through a throttle actuator 12 based on a deviation between the target throttle opening position and the throttle opening position detected by the throttle position sensor 9 so as to make the detected throttle opening position coincident with the target throttle opening position.

The electromagnetic clutch 2 is interposed between a crank shaft 21 of the engine 1 and an input shaft 22 of the synchronous mesh automatic transmission 3 to control transmission/interruption of the power from the crank shaft 21 to the input shaft 22 of the synchronous mesh automatic transmission 3. The electromagnetic clutch 2 is controlled by the control unit 4 such that a clutch excitation current of the magnitude in proportion to a clutch transmission torque is supplied thereto. The rotational torque of the crank shaft 21 is transmitted, as the clutch transmission torque controlled by the control unit 4, to the input shaft 22 of the synchronous mesh automatic transmission 3.

The synchronous mesh automatic transmission 3 is constructed, for instance, as a counter shaft type five—stage gear transmission including five pairs of advancing transmission gear trains 33 to 36 and 38 different in gear ratio, one pair of a reverse transmission gear train 37, and a shift gear 100 made up of plural sleeve gears (three sleeve gears 100a to 100c in this embodiment) for shifting connection between the output shaft 32 and these transmission gear trains. The input rotational force transmitted from the crank shaft 21 through the electromagnetic clutch 2 to the input shaft 22 is first transmitted through a primary gear train 33, which is located foremost (the most left-hand side in FIG. 1) on the input shaft 22, to a counter-shaft 31 that is juxtaposed with respect to the input shaft 22. The output shaft 32 is disposed coaxially to the input shaft 22. Driven side gears 33a to 36a and 38a of the advancing transmission gear trains 33 to 36 and 38, and a driven side gear 37a of the reverse transmission gear train 37 are rotatably mounted on the output shaft 32. Driving side gears 33b to 36b and 38b of the advancing transmission gear trains 33 to 36 and 38, and a driving side gear 37b of the reverse transmission gear train 37 are fixed onto the counter-shaft 31 juxtaposed to the output shaft 32. Axially movably but non-rotatably provided on the output shaft 32 are: a first sleeve gear 100a forwardly of the third-speed gear train 34 (i.e. between the primary gear train 33 and the third-speed gear train 34); a second sleeve gear 100b between the second-speed gear train 35 and the first-speed gear train 36; and a third sleeve gear 100c between the reverse transmission gear train 37 and the fifth-speed gear train 38. The first sleeve gear 100a is moved along the output shaft 32 by a shift fork 101 (described later) and connected to the driven side gear 33a of the primary gear train 33, to directly connect the input shaft 22 and the output shaft 32. In this case, the first sleeve gear 100a serves as a fourth-speed gear train. Depending on which one of the driven side gears 33a to 36a and 38a of the advancing transmission gear trains 33 to 36 and 38, and the driven side gear 37a of the reverse transmission gear train 37 is connected, a transmission path and a transmission ratio (a gear ratio of the primary gear x a gear ratio of each speed gear) are varied.

The shift gear 100 of the synchronous mesh automatic transmission 3 is shift-controlled by a gear changing, shift select actuator 5 controlled by way of the output signal of the control unit 4, to thereby perform a speed change operation through a release mode to release the mechanical meshing between gears of the currently used speed changing stage, and a connection mode to establish the mechanical meshing between gears of a next speed changing stage to be used.

The control unit 4 receives a shift lever position signal for outputting a switch signal depending on the position of the shift lever 14 operated by a driver, an output signal of the accelerator position sensor 13 indicative of the depressed quantity of the accelerator pedal (not shown), and an output signal of a transmission output shaft rotational speed sensor 8 that detects the rotational speed of the transmission output shaft 32, and based on these signals, the control unit 4 operates as follows. That is, it determines a speed changing stage suitable for the vehicle running condition on the basis of a transmission shift pattern (not shown), and outputs a control signal to the shift select actuator 5 while detecting the shift select position of the shift lever 14 by way of the shift select position sensor 6, thereby shift-controlling the shift gear 100 and performing the speed change operation in a release mode to release the mechanical meshing between the gears of the currently used speed changing stage, and in a connection mode to establish the mechanical meshing between the gears of the next speed changing stage to be used.

The synchronous state of the shift gear 100 is detected on the basis of a relationship between the rotational speeds of the transmission input shaft and the transmission output shaft, which are respectively detected by a transmission input shaft rotational speed sensor 7 and the transmission output shaft rotational speed sensor 8. During the gear stage change, the throttle valve 11 is operated to close to a predetermined opening position by the throttle actuator 12, and the excitation current to the electromagnetic clutch 2 is turned off, so that the synchronous mesh transmission is put into a power-off or inoperative state to perform the gear stage change.

Figure 2:
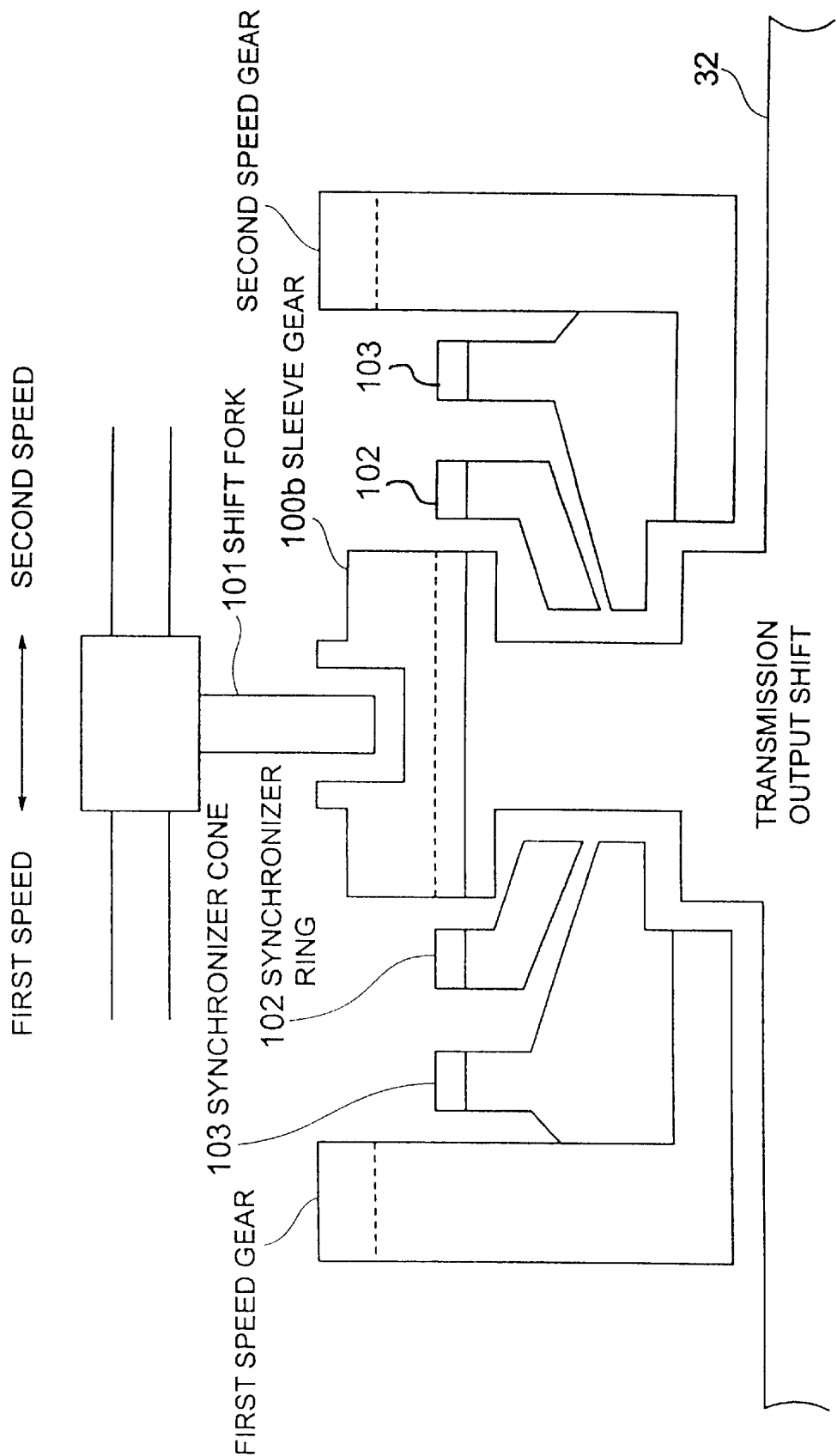
FIG. 2 shows a construction of a synchronizer for changing the gear from a first speed stage to a second speed stage according to a first embodiment of the present invention.

FIG. 2 shows a motion of the shift gear 100 when the first speed stage is changed to the second speed stage in the synchronous mesh automatic transmission according to the first embodiment of the present invention. In the first speed stage, the second sleeve gear 100b of the shift gear 100 is meshed with a synchronizer ring 102 and a synchronizer cone 103 on the first speed side, so that the power is transmitted from the first speed gear through the second shift gear 100b to the transmission output shaft 33. When the speed change from the first speed to the second speed is commanded, the shift fork 101 is controlled to shift toward the second speed side by the shift select actuator 5 under the control of the control unit 4 to mechanically release the second sleeve gear 100b from the first speed. The second sleeve gear 100b then pushes a second speed side synchronizer ring 102 toward the second speed side against a synchronizer cone 103 to create a rotational synchronization between the transmission output shaft 33 and a second speed gear shaft, so that the second sleeve gear 100b is mechanically meshed with the synchronizer ring 102 and the synchronizer cone 103 for the second speed side. In this manner, the speed change from the first speed stage to the second speed stage is completed.

Figure 3:
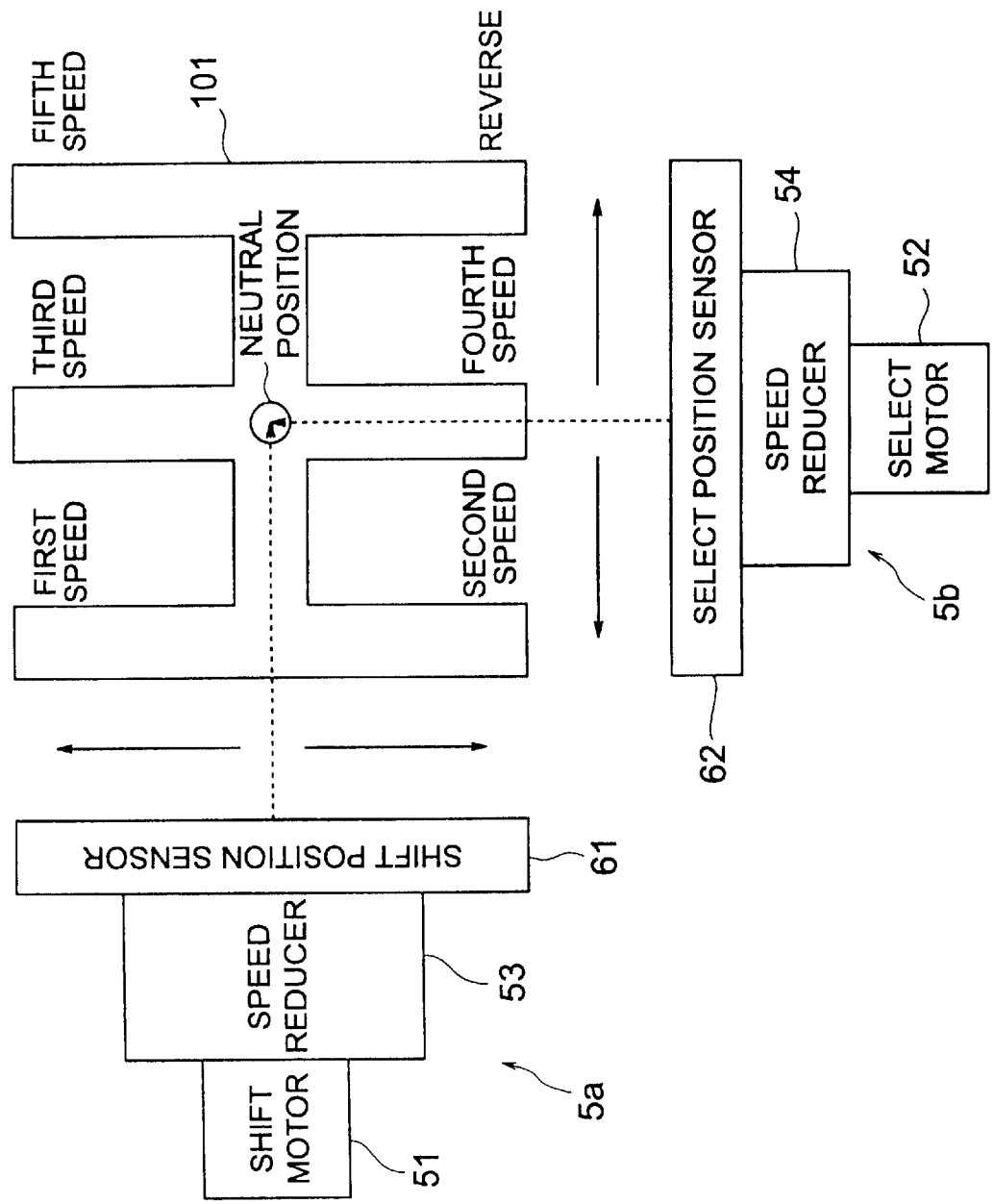
FIG. 3 shows a relationship between a shift select actuator and a position sensor according to the first embodiment.

FIG. 3 shows a construction of the shift select actuator 5 and the shift select position sensor 6 in the synchronous mesh automatic transmission according to the first embodiment of the present invention.

As shown in FIG. 3, the shift select actuator 5 includes a shift actuator 5a for shift-driving the shift fork 101 in an axial direction, and a select actuator 5b for select-driving the shift fork 101 in a rotational direction. The shift actuator 5a has a shift motor 51 for moving the shift fork 101 in an axial direction of the output shaft 32, and a speed reducer 53 for speed-reducing the driving force of the shift motor 51 and transmitting the speed-reduced driving force to the shift fork 101. The select actuator 5b has a select motor 52 for moving the shift fork 101 in a rotational direction, and a speed reducer 54 for speed-reducing the driving force of the select motor 52 and transmitting the speed-reduced driving force to the shift fork 101.

The shift select position sensor 6 includes a shift position sensor 61, provided adjacent to the speed reducer 53 of the shift actuator 5a, for detecting the shift position of the shift fork 101, and a select position sensor 62, provided adjacent to the speed reducer 54 of the select actuator 5b, for detecting the select position of the shift fork 101.

The shift control by the control unit 4 is carried out as follows. That is, the shift fork 101 is driven in the axial direction of the transmission output shaft 33 by the shift motor 51 built in the shift actuator 5a through the speed reducer 53, and the shift position of the shift fork 101 is detected by the shift position sensor 61 for the feed-back control of the shift position.

The select control by the control unit 4 is carried out as follows. That is, the shift fork 101 is driven in the rotational direction of the transmission output shaft 33 by the select motor 52 built in the select actuator 5b through the speed reducer 54 to be selectively engaged with one of the sleeve gears 100a to 100c of the shift gear 100, and the select position of the shift fork 101 is detected by the select position sensor 62 for the feed-back control of the select position.

Figure 4:
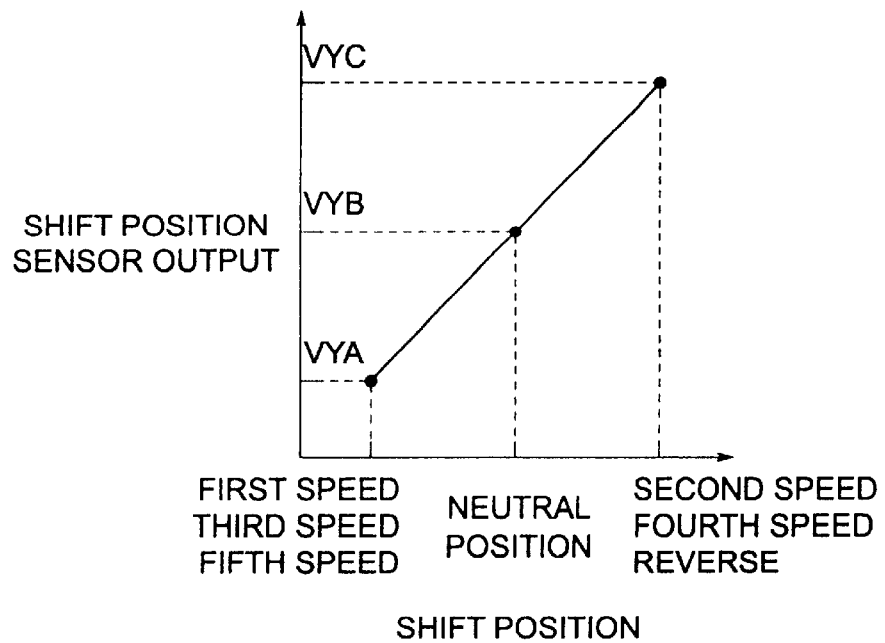
FIG. 4 shows an output characteristic of a shift position sensor relative to a shift position according to the first embodiment.

FIG. 4 shows a relationship of an output characteristic of the shift position sensor 61 to the shift position of the shift fork 101. Characters VYA, VYB and VYC respectively represent a shift position voltage learned value for each of the first speed, the third speed and the fifth speed, a shift position voltage learned value for a neutral position, and a shift position voltage learned value for each of the second speed, the fourth speed and the reverse.

Figure 5:
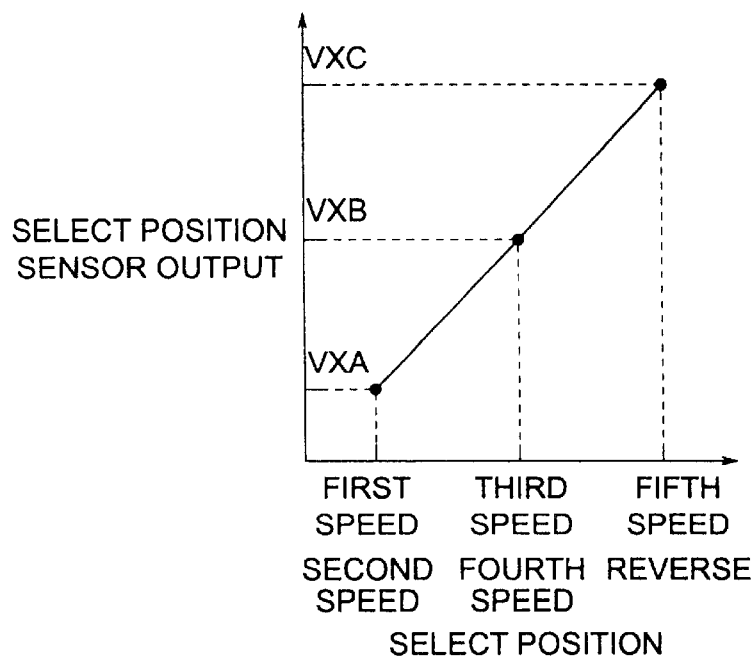
FIG. 5 shows an output characteristic of a select position sensor relative to a select position according to the first embodiment.

FIG. 5 shows a relationship of an output characteristic of the select position sensor 62 to the select position of the shift fork 101. Characters VXA, VXB and VXC respectively represents a select position voltage learned value for each of the first speed and the second speed, a select position voltage learned value for each of the third speed and the fourth speed (including the neutral position), and a select position voltage learned value for each of the fifth speed and the reverse.

Next, the operation of this first embodiment will be described.

Figure 6:
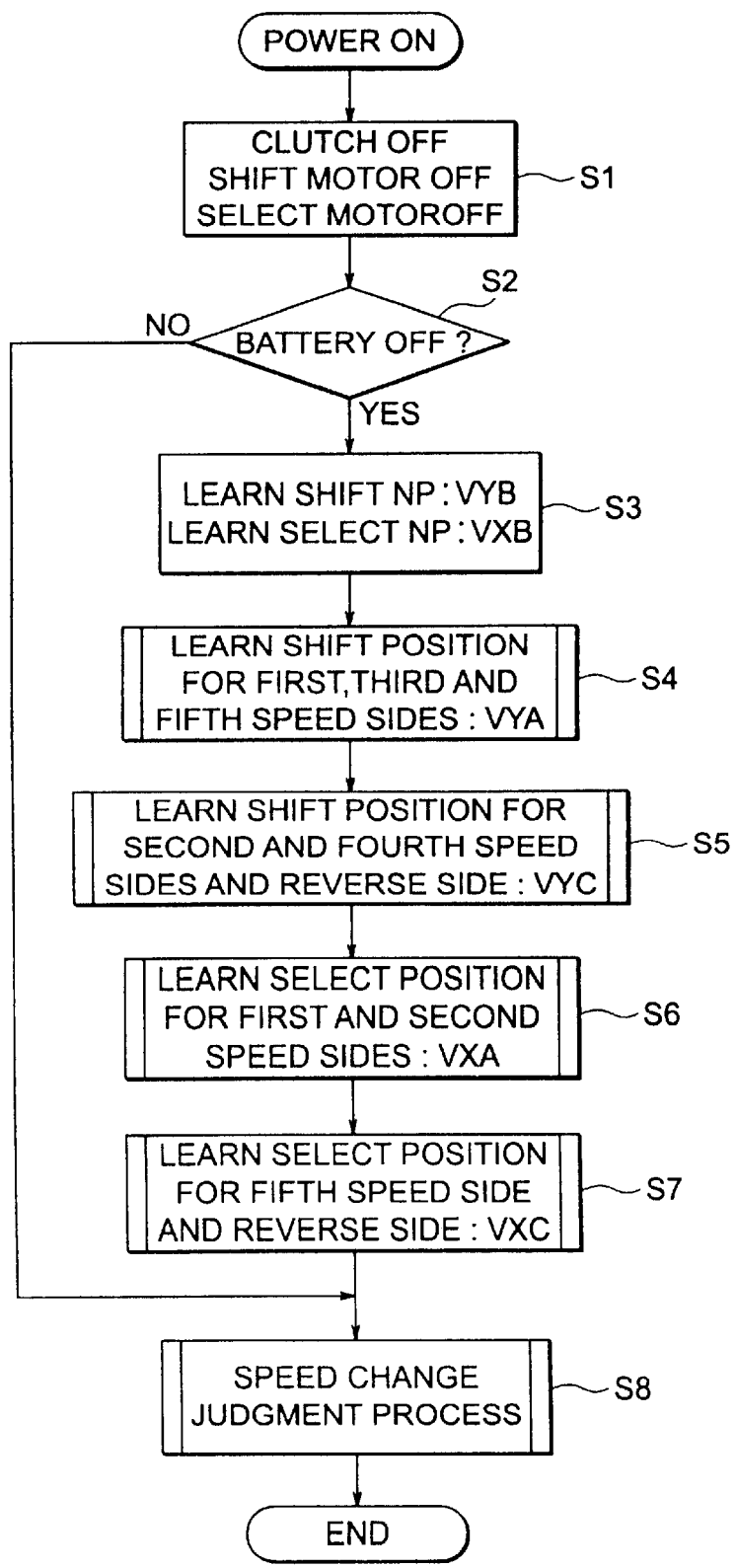
FIG. 6 shows a flow char t of a shift select position learning process according to the first embodiment.

FIG. 6 is a flow chart showing an operation for learning the respective shift positions and the respective select positions. In FIG. 6, when a switch in the form of a key switch for turning on and off power supplied from a battery (not shown) to the control unit 4 is turned on, the electromagnetic clutch 2 is turned off (the excitation current is turned off) to establish a neutral or disconnected state between the engine 1 and the automatic transmission 3, and further both of the shift motor 51 and the select motor 52 are turned off (Step S1).

Next, whether or not a battery has been disconnected before the key switch is turned on is judged on the basis of a storage value of RAM built in the control unit 4 (Step S2), and if no, then the program advances to speed change process (Step S8) without learning steps since leaned values for the shift positions and the select positions are stored and thus available.

If the disconnection of the battery is detected in the Step S2 (i.e. Yes), then the shift neutral position (Shift NP) is learned as the output voltage value VYB of the shift position sensor 61, and similarly the select neutral position (Select NP) is learned as the output voltage value VXB of the select position sensor 62 (Step S3).

The shift motor 51 is driven from the shift neutral position to the third speed shift position, and when the output voltage value of the shift position sensor 61 is sufficiently stabilized, the stabilized voltage value VYA is learned as the shift position for each of the first speed, the third speed and the fifth speed (Step 4).

Next, the shift motor 51 is driven from the third speed shift position to the fourth speed shift position, and when the output voltage value of the shift position sensor 61 is sufficiently stabilized, the stabilized voltage value VYC is learned as the shift position for each of the second speed, the fourth speed and the reverse (Step 5). Thereafter, the shift motor 51 is returned again to the shift neutral position.

The select neutral position serves also as the select position learned value VXB for each of the third speed and the fourth speed. The select motor 52 is driven from this select neutral position to the select position for each of the first speed and the second speed, and when the output voltage value of the select position sensor 62 is sufficiently stabilized, the stabilized voltage value VXA is learned as the select position for each of the first speed and second speed (Step 6).

Next, the select motor 52 is driven from the select position for each of the first speed and the second speed to the select position for each of the fifth speed and the reverse, and when the output voltage value of the select position sensor 62 is sufficiently stabilized, the stabilized voltage value VXC is learned as the select position for each of the fifth speed and the reverse (Step 7). Thereafter, the select motor 52 is returned again to the select neutral position, and the program advances to the speed change judgment process (Step S8), and then ends the process.

Figure 7:
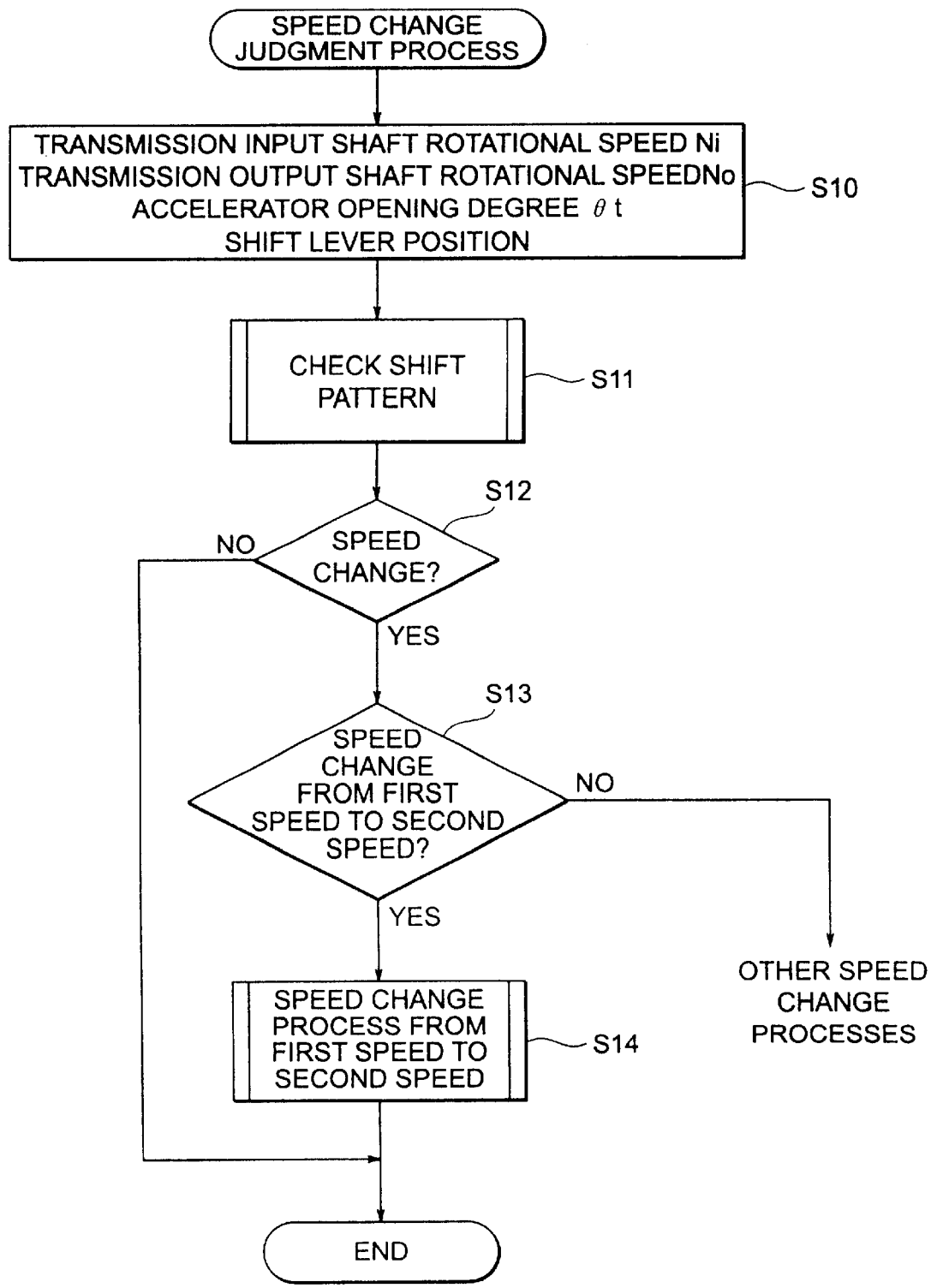
FIG. 7 shows a flow chart of a speed change judgment process according to the first embodiment.

FIG. 7 is a flow chart showing a speed change judgment process of the synchronous mesh automatic transmission. In FIG. 7, the control unit 4 reads a shift lever position (e.g., P, R. N, or D position) signal outputted as a switch signal in response to the motion of the shift lever 14 operated by a driver. A transmission input shaft rotational speed Ni and a transmission output shaft rotational speed No are calculated on the basis of rotational speed input signals fed from the transmission input shaft rotational speed sensor 7 and the transmission output shaft rotational speed sensor 8. The depressed quantity of the accelerator pedal by the driver is detected as a voltage value by the accelerator position sensor 13 to determine the accelerator opening or depression degree θt (Step S10).

In Step S11, if the shift lever position is in a D (Drive) range, a shift pattern check is carried out based on the accelerator opening degree θt and the transmission output shaft rotational speed No corresponding to a vehicle speed, while using a preset shift pattern diagram (not shown).

It is judged, in Step 512, as to whether or not a speed change request occurs upon the shift pattern check in the Step 11, and if the speed change request occurs, then it is judged, in Step 13, as to whether the speed change request is a request for changing from the first speed to the second speed. If it is the request for changing from the first speed to the second speed, then a speed change process from the first speed to the second speed is carried out in Step S14. For other speed change requests, a similar process is carried out.

Figure 8:
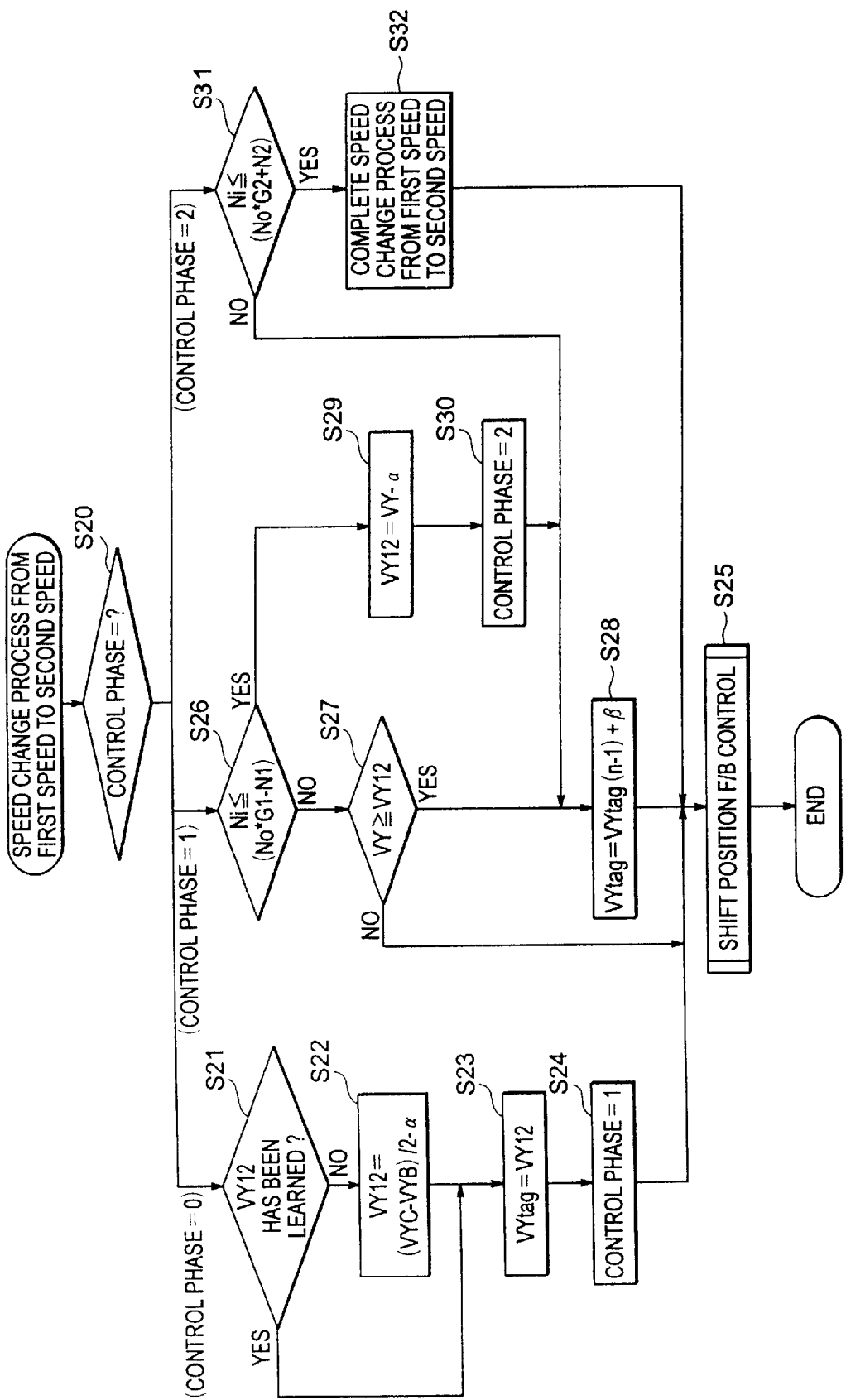
FIG. 8 shows a flow chart of a speed change process from a first speed to a second speed according to the first embodiment.

FIG. 8 shows a flow chart of a speed change process from the first speed to the second speed in the synchronous mesh automatic transmission. In FIG. 8, a control phase for the speed change process from the first speed to the second speed is determined in Step 20, which is followed by a process in a corresponding control phase.

In case of the control phase=0, the program advances to Step S21 where it is determined whether or not a synchronization starting shift position for the speed change from the first speed to the second speed has been learned. If it has not been learned yet, the program advances to Step S22 where an initial value of the synchronization starting shift position learned value VY12 for the speed change from the first speed to the second speed is calculated and set through a formula (1) using the second speed shift position learned value VYC and the shift neutral position learned value VYB.

$$VY12=(VYC-VYB)/2-\alpha \tag{1}$$

Here, α is a predetermined voltage value (for instance, 0.1 V) which is preliminarily set for the purpose of reducing the shift speed before the synchronization starting shift position, and avoiding abrupt gear meshing.

If it is determined in Step S21 that the synchronization starting shift position learned value VY12 for the speed change from the first speed to the second speed exists, the existing synchronization starting shift position learned value VY12 is set as a target shift position VYtag (Step S23) in order to perform the shift motion to the target shift position VYtag at a first shift motion speed, and the control phase is updated as 1 (Step S24). Then, in Step S25, the shift motor 51 is driven at the first shift motion speed under a control (such as a PID control) based on a positional deviation between the target shift position VYtag and the actual shift position VY, thereby performing the shift position feed back (F/B) control. This operation releases the mechanical meshing of the second sleeve gear 100b with the synchronizer corn 103 and synchronizer ring 102 on the first speed gear side.

In case of the control phase=1, the control phase is such that the second sleeve gear 100b is controlled to shift toward the second speed gear, and lasts until the synchronizer ring 102 on the second speed gear side is urged onto the synchronizer corn 103 to start the rotational synchronization. The judgment for the start of the rotational synchronization of the synchronizer, i.e. the judgment for the synchronization starting shift position, is made based on whether or not the transmission input shaft rotational speed Ni and the transmission output shaft rotational speed No meet a condition defined by the following formula (2).

$$Ni \leq (No* G1-N1) \tag{2}$$

Here, G1 is a gear ratio of the first speed, and N1 is a predetermined number of rotation (for instance, 100 rpm) that is preliminarily set in order to detect the state where the input shaft rotational speed is lowered from a rotational speed at the first speed stage to a rotational speed at the second speed stage as a consequence of the start of the rotational synchronization of the synchronizer.

If it is judged in Step S26 that the rotational synchronization of the synchronizer has not been started (NO), then the program advances to Step S27 where judgment is made as to whether or not the shift position signal VY, i.e. the output of the shift position sensor 61, reaches the synchronization starting shift position learned value VY12 for the speed change from the first speed to the second speed. If the value VY12 has not been reached yet (NO judgment), then the program advances to Step S25 where the shift position feed back (F/B) control is continued at the first shift motion speed, whereas if the value VY12 has been reached, then the target shift position VYtag is set using the following formula (3) in Step S28, and the shift position feed back (F/B) control (Step S25) is continued at a second shift motion speed (that is slower than the first shift motion speed), and the rotational synchronization start of the synchronizer is awaited.

$$VYtag(n)=VYtag(n-1)+\beta \tag{3}$$

Here, VYtag(n) represents a target shift position in the current control cycle, VYtag(n−1) represents a target shift position in the last control cycle, and β represents a constant which defines an increment of the target shift position and which is set based on the kind of a speed change and the transmission output shaft rotational speed. The magnitude of the constant β makes the shift motion speed adjustable.

If it is judged in Step S26 that the rotational synchronization of the synchronizer has been started (Yes), then a current synchronization starting shift position learned value VY12(n) for the speed change from the first speed to the second speed is calculated and updated through the following formula (4) using the shift position detection value VY(s) at the time of the rotational synchronization start judgment. Thereafter, in Step S30, the control phase is updated as "2", and the processes of the Steps S28 and S25 are carried out.

$$VY12(n)=VY(s)-\alpha \quad (4)$$

In case of the control phase=2, the control phase is such that the second shift gear 100*b* is brought into a gear meshing state as a consequence of the rotational synchronization of the synchronizer ring 102 and the synchronizer cone 103 on the second speed gear side in Step S31, the judgment for the rotational synchronization of the synchronizer is made based on whether or not the transmission input shaft rotational speed Ni and the transmission output shaft rotational speed No meet a condition defined by the following formula (5).

$$(No^* G2-N2) \leq Ni \leq (No^* G2+N2) \quad (5)$$

Here, G2 is a gear ratio of the second speed stage, N2 is a predetermined number of rotation (for instance, 50 rpm) that is preliminarily set in order to detect the state in which the rotational synchronization of the synchronizer has nearly been completed, and the state in which the input shaft rotational speed Ni is synchronized with a rotational speed (No * G2) in the second speed stage.

If it is judged in Step S31 that the second speed rotational synchronization has not yet been completed ("No" judgment), then the program advances to Step S28 where the shift position feed back control in the control phase 1 is carried out while updating the target shift position. If it is judged that the second speed rotational synchronization has been completed ("Yes" judgment), then the shift position detection value VY at the time of the judgment is learned as the second speed shift position learned value VYC2, and set as the target shift position VYtag. The shift position feed back control in Step 25 is then continued for a predetermined time period, and the speed change process from the first speed to the second speed is ended.

A periodic factor may be added to the second speed synchronization judgment, and the judgment in this case also provides the similar effect. That is, during the process of the control phase 1 of FIG. 8 according to the first embodiment, the judgment for the rotational synchronization start (the synchronization starting shift position) where the rotational synchronization is started as a consequence of the second sleeve gear 100*b* being controlled to shift toward the second speed gear side to thereby urge the synchronizer ring 102 on the second speed gear side against the synchronizer corn 103 is made based on a relationship among the transmission input shaft rotational speed Ni, the transmission output shaft rotational speed No and the gear ratio G1, but the following may be added to this for the judgment. As a shift position condition in which rotational synchronization can be started, a condition may be judged additionally as to whether or not the shift position sensor output or the like falls within a predetermined value range {VY ≧(VY12−γ):γ=0.2 V or the like}. Alternatively, a condition may be judged additionally as to whether or not the relationship of the formula (2) among the transmission input shaft rotational speed Ni, the transmission output shaft rotational speed No and the gear ratio G1 has been continued for a predetermined time period. In either of the cases, the similar effect can be obtained.

In the first embodiment described above, the motordriven type shift select actuator 5 is used, but this may be replaced with a hydraulically driven type one.

Second Embodiment

The basic control for the speed change from the first speed to the second speed according to a second embodiment of the present invention is the same as that according to the first embodiment, and the detailed description thereof is omitted. In the second embodiment, however, to the speed change completion judgment condition (the judgment condition in Step S31) of the first embodiment, judgment is added as to whether or not changing of the gear stage due to the shift select control during the speed change of the synchronous mesh automatic transmission has been completed. That is, if the second speed shift position detection value VY falls within a predetermined value range (for instance,±0.1 V) from the last or latest second speed shift position learned value VYC2 (n−1), and if the second speed select position detection value VX falls within a predetermined value range (for instance,±0.1 V) from the last or latest second speed select position learned value VXA2 (n−1), then judgment is made such that the speed change from the first speed to the second speed has been completed, and the second speed shift position detection value VY and the second speed select position detection value VX are updated respectively as the current learned values VYC2(n) and VXA2(n).

As described above, the control device for the synchronous mesh automatic transmission according to the present invention can perform a smooth and speedy shift motion in a stable manner by detecting and learning the synchronization starting shift position of the synchronizer under the shift control of the shift actuator during a speed-changing operation. Therefore, it is possible to enhance the durability of the synchronizer, prevent the occurrence of gear noise during gear shifting, and shorten the time period required for shifting to thereby improve the driver's shift feeling.

To summarize, the present invention provides the following advantages.

A control device for a synchronous mesh automatic transmission that automatically changes a plurality of gear stages according to one aspect of the present invention comprises: an input shaft; an output shaft; a plurality of speed-changing gear trains for transmitting a rotation of the input shaft to the output shaft while changing a speed of rotation; a shift gear for selecting one of the plurality of speed-changing gear trains, and transmitting power from the input shaft to the output shaft through the thus selected speed-changing gear train; a shift actuator for driving the shift gear; a shift position sensor for detecting a shift position of the shift gear; an input shaft rotational speed sensor for detecting a rotational speed of the input shaft; an output shaft rotational speed sensor for detecting a rotational speed of the output shaft; and a control unit for learning and correcting, during a-gear changing operation of the shift gear caused by the shift actuator, a synchronization starting shift position of the shift gear based on an output of the shift position sensor, and a relationship among a gear ratio, the rotational speed of the transmission input shaft detected by the input shaft rotational speed sensor, and the rotational speed of the transmission output shaft detected by the output shaft rotational speed sensor.

With this arrangement, the synchronizing motion at the time of gear stage change is not abrupt, and smooth rotational synchronization between the input shaft side of the transmission and the output shaft side thereof at the time of the gear stage change can be realized. In addition, gear noise at the time of the gear stage change can be suppressed, and the durability of the synchronizing mechanism can be enhanced.

A control device for a synchronous mesh automatic transmission that automatically changes a plurality of gear stages according to another aspect of the invention comprises: an input shaft; an output shaft; a plurality of speed-changing gear trains for transmitting a rotation of the input shaft to the output shaft while changing a speed of rotation; a shift gear for selecting one of the plurality of speed-changing gear trains, and transmitting power from the input shaft to the output shaft through the thus selected speed-changing gear train; a shift actuator for driving the shift gear in an axial direction; a shift position sensor for detecting a shift position of the shift gear; a select actuator for driving the shift gear in a rotational direction to thereby select one of the plurality of speed-changing gear trains; a select position sensor for detecting a select position of the select actuator; an input shaft rotational speed sensor for detecting a rotational speed of the input shaft; an output shaft rotational speed sensor for detecting a rotational speed of the output shaft; and a control unit for determining, during a gear changing operation of the shift gear caused by the shift actuator, the completion of the gear changing operation based on a relationship among the input shaft rotational speed and the output shaft rotational speed of the transmission, and a gear ratio, and based on a relationship between the shift gear shift position detected by the shift position sensor and the shift gear select position detected by the select position sensor.

With this arrangement, there are provided the following advantages in addition to the above-mentioned advantages obtained according to the first aspect of the invention. That is, it is possible to perform a gear stage changing operation in a reliable manner, thus further improving safety in operation of the control device.

An initial value of the synchronization starting shift position learned value may preferably be set based on a shift neutral position learned value and a shift completion position learned value of the shift gear learned by the control unit. Thus, even if the synchronization starting shift position has not yet been learned, the synchronizing motion at the time of the gear stage change does not become abrupt. Consequently, it is possible to perform smooth rotational synchronization between the input shaft side of the transmission and the output shaft side thereof at the time of the gear stage change, suppress gear noise at the time of changing the gear stage, and enhance the durability of the synchronizing mechanism.

Moreover, the shift neutral position and the shift completion position may preferably be learned by the control unit when a switch for turning on and off power supplied from a battery to the control unit is turned on after removal of the battery. Thus, even if data of the shift neutral position learned value and the shift completion position learned value disappear as the result of removal of the battery to create a state in which the synchronization staring shift position has not yet been learned, the synchronizing motion at the time of the gear stage change does not become abrupt. Consequently, it is possible to perform smooth rotational synchronization between the input shaft side of the transmission and the output shaft side thereof at the time of the gear stage change, suppress gear noise at the time of the gear stage change, and enhance the durability of the synchronizing mechanism.

In addition, the shift gear may preferably be moved at a first shift speed from a shift starting position to a synchronization starting shift position of the shift gear, and at a second shift speed from the synchronization starting shift position to a shift completion position during the gear changing operation of the shift gear. Therefore, the synchronizing motion at the time of the gear stage change does not become abrupt. Consequently, it is possible to perform a speedy change motion of the gear stages, suppress gear noise, enhance the durability of the synchronizing mechanism, and provide a good shift feeling.

Furthermore, the second shift speed from the synchronization starting shift position to the shift completion position may preferably be set based on the kind of a speed change and the transmission output shaft rotational speed during a gear changing operation of the shift gear. Thus, the shift speed is controlled in accordance with a difference between the rotational speeds of the input shaft and output shaft of the transmission at the time of the gear changing operation. Consequently, it is possible to suppress gear noise, enhance the durability of the synchronizing mechanism, and provide a good shift feeling.

What is claimed is:

1. A control device for a synchronous mesh automatic transmission that automatically changes a plurality of gear stages, said control device comprising:

an input shaft;

an output shaft;

a plurality of speed-changing gear trains for transmitting a rotation of said input shaft to said output shaft while changing a speed of rotation of said output shaft;

a shift gear for selecting one of said plurality of speed-changing gear trains, and transmitting power from said input shaft to said output shaft through the one selected speed-changing gear train;

a shift actuator for driving said shift gear;

a shift position sensor for detecting a shift position of said shift gear;

an input shaft rotational speed sensor for detecting a rotational speed of said input shaft;

an output shaft rotational speed sensor for detecting a rotational speed of said output shaft; and a control unit for learning and correcting, during a gear changing operation of said shift gear caused by said shift actuator, a value of a synchronization starting shift position of said shift gear based on an output of said shift position sensor, and based on a relationship among a gear ratio, the rotational speed of said transmission input shaft detected by said input shaft rotational speed sensor, and the rotational speed of the transmission output shaft detected by said output shaft rotational speed sensor, wherein an initial value of said synchronization starting shift position value is set based on learned values of a shift neutral position and a shift completion position of said shift gear learned by said control unit.

2. The control device for a synchronous mesh automatic transmission according to claim 1, further comprising a switch for turning on and off electrical power to said control unit, wherein said shift neutral position and said shift completion position are learned by said control unit when said switch is turned on after removal of a battery has corrupted storage values of said shift neutral position and said shift completion position.

3. The control device for a synchronous mesh automatic transmission according to claim 1, wherein said shift gear is moved at a first shift speed from a shift starting position to a synchronization starting shift position of said shift gear both determined by said control unit, and at a second shift speed from the synchronization starting shift position to a shift completion position of said shift gear determined by said control unit during the gear changing operation of said shift gear.

4. The control device for a synchronous mesh automatic transmission according to claim 3, wherein said second shift speed from the synchronization starting shift position to the shift completion position of said shift gear is set based on the speed change, and the transmission output shaft rotational speed during the gear changing operation of said shift gear.

5. A control device for a synchronous mesh automatic transmission that automatically changes a plurality of gear stages, said control device comprising:

an input shaft;

an output shaft;

a plurality of speed-changing gear trains for transmitting a rotation of said input shaft to said output shaft while changing a speed of rotation;

a shift gear for selecting one of said plurality of speed-changing gear trains, and transmitting power from said input shaft to said output shaft through the one selected speed-changing gear train;

a shift actuator for driving said shift gear in an axial direction;

a shift position sensor for detecting a shift position of said shift gear;

a select actuator for driving said shift gear in a rotational direction to thereby select one of said plurality of speed-changing gear trains;

a select position sensor for detecting a select position of said shift gear;

an input shaft rotational speed sensor for detecting a rotational speed of said input shaft;

an output shaft rotational speed sensor for detecting a rotational speed of said output shaft; and a control unit for determining, during a gear changing operation of said shift gear caused by said shift actuator, the completion of the gear changing operation based on a relationship among the input shaft rotational speed, the output shaft rotational speed, and a gear ratio, and based on a relationship between the shift gear's shift position detected by said shift position sensor and the shift gear's select position detected by said select position sensor.

6. The control device for a synchronous mesh automatic transmission according to claim 5, wherein an initial value of a synchronization starting shift position value is set based on a shift neutral position value and a shift completion position value of said shift gear learned by said control unit.

7. The control device for a synchronous mesh automatic transmission according to claim 5, further comprising a switch for turning on and off electrical power to said control unit, wherein a shift neutral position and a shift completion position are learned by said control unit when said switch is turned on after removal of a battery has corrupted storage values of said shift neutral position and said shift completion position.

8. The control device for a synchronous mesh automatic transmission according to claim 5, wherein said shift gear is moved at a first shift speed from a shift starting position to a synchronization starting shift position of said shift gear both determined by said control unit, and at a second shift speed from the synchronization starting shift position to a shift completion position of said shift gear determined by said control unit during the gear changing operation of said shift gear.

9. The control device for a synchronous mesh automatic transmission according to claim 8, wherein said second shift speed from the synchronization starting shift position to the shift completion position of said shift gear is set based on the speed change, and the transmission output shaft rotational speed during the gear changing operation of said shift gear.

* * * * *